United States Patent Office 3,398,257
Patented Aug. 20, 1968

3,398,257
FERROUS WELDING ELECTRODE FOR
MANUAL ARC WELDING
Albert E. Wiehe, West Manchester Township, York County, Pa., assignor to The McKay Company, Pittsburgh, Pa., a corporation of Pennsylvania
No Drawing. Filed Aug. 10, 1965, Ser. No. 478,731
8 Claims. (Cl. 219—146)

This invention relates to a ferrous welding electrode for manual arc welding. More particularly, it relates to a ferrous welding electrode for manual arc welding for accomplishment of a commercially acceptable welding operation while transferring titanium from the electrode across an electric arc to form a weld deposit containing titanium carbide precipitated in situ for increased wear resistance.

In copending United States patent application Ser. No. 288,075, filed June 17, 1963, now Patent No. 3,231,709, there are disclosed a welding method and electrode for producing a weld deposit containing titanium carbide particles crystallized in situ in the solidifying weld metal. The application discloses that the presence of from about 1% to about 20% of such crystallized titanium carbide by weight of the weld deposit provides greatly increased wear resisting properties in the deposit which is a significant advantage in hard facing overlays subjected to severe high stress abrasion. The application establishes that titanium from various sources can be efficiently transferred across an electric arc in the presence of high carbon; as a result, titanium carbide crystals can be precipitated in situ in the solidifying deposit.

The invention disclosed in said application is workable and can produce the desired end result, i.e., a weld deposit containing particles of titanium carbide for increased wear resistance. However, I found that whenever more than about 1.6% titanium by weight of the electrode metal was added by incorporating it into the electrode coating either as the metal itself or as one of its compounds the transfer of such titanium across the arc usually adversely affected operation of the electrode. "Electrode metal" is defined as the sum of the carbon and the metallic components either present in the electrode or recoverable from compounds present in it. Operation of early electrodes formulated to provide the desired deposit was so poor as to be considered only marginally salable. This poor welding operation had the following listed characteristics:

(a) The molten slag interfered with the arc by floating across the pool of molten metal and going under the arc.
(b) The burning off of the electrode produced voluminous clouds of smoke which interfered with vision and irritated the welder's eyes.
(c) Spatter was very high, and large globs of metal "exploded" from the arc and left the area of the molten weld metal pool.
(d) The resulting deposit often contained porosity because of (a) and (c).
(e) It was difficult to control the molten weld metal.

Thus, prior to my invention a situation existed wherein a very useful weld deposit was possible but no coated manual welding electrode had been made which would produce such a deposit in the performance of commercially acceptable welding operation.

I have found that titanium in amounts up to about 1.6% by weight of the electrode metal can be transferred from the coating of a coated manual welding electrode across an electric arc with no adverse effect on welding operation, but to maintain such commercially acceptable operation at higher titanium levels all titanium in excess of about 1.6% by weight of the electrode metal, and preferably all titanium in excess of about 1.4% by weight of the electrode metal, should be incorporated in the fill of a composite electrode comprising a tubular sheath with fill inside the sheath and a coating on the outside of the sheath, where such titanium is provided in the form of titanium metal, alloys of titanium with other metal or titanium carbide. Moreover, I have found that the welding operation under such conditions can be further improved if the total carbon in the electrode is maintained in the range specified hereinbelow. For best results the electrodes may be coated with a conventional "consumable" type coating (i.e., carbon, alloy, binder and only minor amounts of other slag forming ingredients).

I provide a ferrous welding electrode for manual arc welding comprising a tubular sheath with fill inside the sheath and a coating on the outside of the sheath, the sheath being of ferrous metal, the electrode containing titanium, the coating containing no more than about 1.6% titanium and preferably no more than about 1.4% titanium, the fill containing up to about 22% titanium, the titanium of the fill being contained in at least one of the materials of the group consisting of titanium metal, alloys of titanium with other metal and titanium carbide, the total amount of titanium in the electrode being equal to from about 1% to about 22%, the electrode also containing carbon in an amount equal to not less than about (¼ × percent titanium + 1.0%) and not more than about (¼ × percent titanium + 9.0%), all percentages being by weight of the electrode metal. The weight of the fill is equal to from about 20% to about 50%, preferably from about 25% to about 30%, of the total weight of the sheath and fill together. The weight of the coating is equal to from about 10% to about 30%, preferably from about 18% to about 22%, of the total weight of the sheath, fill and coating together. This provides a rather thin consumable coating which is advantageous in that it is not as refractory as a thicker coating would be and thus is consumed more easily.

The limits of carbon defined above, when applied to the titanium limits specified, result in an overall carbon range which is somewhat narrower than that specified in the above mentioned application; however, this restriction is necessary to the accomplishment of a commercially acceptable welding operation.

The term "commercially acceptable welding operation" means a welding operation in which (a) there is minimum interference due to slag under the arc, (b) the smoke level is low enough to afford good visibility and not to irritate the welder, (c) the spatter level is low so that very little metal is lost to the air or other sections of the base plate around the deposit, (d) there is minimum porosity in the deposit and (e) the metal is easily controlled by the welder.

It is my belief that the concentration of all titanium above about 1.6% by weight of the electrode metal in the fill inside the tubular sheath in one of the forms listed is beneficial to operation because in this location the titanium obtains maximum protection from reaction with the oxygen and nitrogen of the air. I have also observed that incorporating titanium in the fill inside the tubular sheath makes the molten weld metal pool more fluid and easy to control, presumably because of the increased protection afforded the titanium by the metallic sheath and electrode coating.

Other details, objects and advantages of the invention will become apparent as the following description of certain present preferred embodiments thereof proceeds.

The accompanying table lists data on eight ferrous welding electrodes for manual arc welding which I have tested. Electrodes numbered 7 and 8 are specific embodiments of my invention. All electrodes were of a nominal 5/32" diameter. Except for the variation in titanium and carbon contents listed the electrode coatings were all similar, being of the conventional "consumable" type described hereinabove. Under the heading "Welding Operation," "Poor" means non-salable or marginally salable and "Good" means commercially acceptable as defined previously. The carbon contents of all electrodes are within the above defined range.

| Electrode No. | Type | | | Coating | | | Total percent Ti in Elect.[2] | Total Percent C in Elect.[2] | Welding Operation |
|---|---|---|---|---|---|---|---|---|---|
| | Description | Percent Ti[2] | Percent C[2] | Percent[3] | Percent Ti[2] | Percent C[2] | | | |
| 1 | Solid wire | 0 | .2 | 32.3 | 4.6 | 4.6 | 4.6 | 4.8 | Poor. |
| 2 | do | 0 | .2 | 29.2 | 4.0 | 4.3 | 4.0 | 4.5 | Do. |
| 3 | Tubular, 28.5% Fill[1] | 4.2 | 4.0 | 34.2 | 4.8 | 5.1 | 9.0 | 9.1 | Do. |
| 4 | Solid wire | 0 | .2 | 30.0 | 3.5 | 5.1 | 3.5 | 5.3 | Do. |
| 5 | Tubular, 28.5% Fill[1] | 4.1 | 3.9 | 34.0 | 4.0 | 5.8 | 8.1 | 9.7 | Do. |
| 6 | Solid wire | 0 | .2 | 30.6 | 4.9 | 6.8 | 4.9 | 7.0 | Do. |
| 7 | Tubular, 27.5% Fill[1] | 6.3 | 4.1 | 20.0 | 0 | 4.9 | 6.3 | 9.0 | Good. |
| 8 | Tubular, 25.3% Fill[1] | 6.0 | 3.8 | 22.0 | 0 | 3.8 | 6.0 | 7.6 | Do. |

[1] Percent of total weight of sheath and fill together.
[2] Percent by weight of electrode metal.
[3] Percent of total weight of sheath, fill and coating together.

It can be seen from the table that commercially acceptable welding operation was not achieved until both the titanium and the carbon conformed to the requirements of my invention as given hereinabove.

While I have described certain present preferred embodiments of my invention it is to be distinctly understood that the invention is not limited thereto but may be otherwise variously embodied within the scope of the following claims.

I claim:

1. A ferrous welding electrode for manual arc welding comprising a tubular sheath with fill inside the sheath and a coating on the outside of the sheath, the sheath being of ferrous metal, the electrode containing titanium, the coating containing no more than about 1.6% titanium, the fill containing up to about 22% titanium, the titanium of the fill being contained in at least one of the materials of the group consisting of titanium metal, alloys of titanium with other metal and titanium carbide, the total amount of titanium in the electrode being equal to from about 1% to about 22%, the electrode also containing carbon in an amount equal to not less than about (¼ × percent titanium + 1.0 percent) and not more than about (¼ × percent titanium + 9.0 percent), all percentages being by weight of the electrode metal.

2. A ferrous welding electrode for manual arc welding as claimed in claim 1 in which the weight of the fill is equal to from about 20% to about 50% of the total weight of the sheath and fill together and the coating contains no more than about 1.4% titanium by weight of the electrode metal.

3. A ferrous welding electrode for manual arc welding as claimed in claim 1 in which the weight of the fill is equal to from about 25% to about 30% of the total weight of the sheath and fill together and the coating contains no more than about 1.4% titanium by weight of the electrode metal.

4. A ferrous welding electrode for manual arc welding as claimed in claim 1 in which the weight of the fill is equal to from about 20% to about 50% of the total weight of the sheath and fill together and the weight of the coating is equal to from about 10% to about 30% of the total weight of the sheath, fill and coating together.

5. A ferrous welding electrode for manual arc welding as claimed in claim 1 in which the weight of the fill is equal to from about 20% to about 50% of the total weight of the sheath and fill together and the weight of the coating is equal to from about 18% to about 22% of the total weight of the sheath, fill and coating together.

6. A ferrous welding electrode for manual arc welding as claimed in claim 4 in which the coating contains no more than about 1.4% titanium by weight of the electrode metal.

7. A ferrous welding electrode for manual arc welding as claimed in claim 5 in which the coating contains no more than about 1.4% titanium by weight of the electrode metal.

8. A ferrous welding electrode for manual arc welding as claimed in claim 1 in which the weight of the fill is equal to from about 25% to about 30% of the total weight of the sheath and fill together and the weight of the coating is equal to from about 18% to about 22% of the total weight of the sheath, fill and coating together and in which the coating contains no more than about 1.4% titanium by weight of the electrode metal.

References Cited

UNITED STATES PATENTS

| 3,036,205 | 5/1962 | Aida et al. | 219—145 X |
| 3,330,934 | 7/1967 | Quaas | 219—146 |
| 3,345,495 | 10/1967 | Quaas et al. | 219—146 |

RICHARD M. WOOD, *Primary Examiner.*

B. A. STEIN, *Assistant Examiner.*

UNITED STATES PATENT OFFICE
CERTIFICATE OF CORRECTION

Patent No. 3,398,257                       August 20, 1968

Albert E. Wiehe

It is certified that error appears in the above identified patent and that said Letters Patent are hereby corrected as shown below:

Column 1, line 35, cancel "creased wear resistance. However, I found that whenever".

Signed and sealed this 13th day of January 1970.

(SEAL)
Attest:

Edward M. Fletcher, Jr.                      WILLIAM E. SCHUYLER, JR.
Attesting Officer                                      Commissioner of Patents